US012585672B2

(12) United States Patent
Shah et al.

(10) Patent No.: US 12,585,672 B2
(45) Date of Patent: Mar. 24, 2026

(54) WORKFLOW FOR DATABASE SYSTEM RECOVERY USING LOCAL AND BACKED UP RESOURCES

(71) Applicant: Microsoft Technology Licensing, LLC, Redmond, WA (US)

(72) Inventors: Nimit Dipakkumar Shah, Redmond, WA (US); Muthukumaran Arumugam, Redmond, WA (US); Yogesh Kumar, Redmond, WA (US); Hari Sudan Sundar, Redmond, WA (US); Ankur Jauhari, San Francisco, CA (US); Per Mikael Horal, Renton, WA (US); Subramanyam Pattipaka, Bellevue, WA (US); Venkata Sivaramakrishna Ramadugu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 18/474,092

(22) Filed: Sep. 25, 2023

(65) Prior Publication Data

US 2025/0103615 A1 Mar. 27, 2025

(51) Int. Cl.
*G06F 16/27* (2019.01)

(52) U.S. Cl.
CPC ................................. *G06F 16/275* (2019.01)

(58) Field of Classification Search
CPC ...................................................... G06F 16/275
See application file for complete search history.

(56) References Cited

U.S. PATENT DOCUMENTS

| | | | | |
|---|---|---|---|---|
| 10,884,874 | B1* | 1/2021 | Chockalingam | G06F 16/256 |
| 2008/0052327 | A1* | 2/2008 | Buah | G06F 11/2023 |

(Continued)

OTHER PUBLICATIONS

"An Open Source, Ultra-Fast & Cost-Effective Distributed SQL Database", Retrieved from: https://en.oceanbase.com/, Retrieved Date: Jul. 16, 2023, 09 Pages.

(Continued)

*Primary Examiner* — Ajay M Bhatia
*Assistant Examiner* — Chongsuh Park
(74) *Attorney, Agent, or Firm* — Han Gim; Newport IP, LLC

(57) ABSTRACT

A data processing system implements techniques for operating and recovering databases that includes a plurality of replicas. The plurality of replicas includes a primary replica, a secondary replica, and a delta replica. The primary replica handles read and write operations, the secondary replica is a backup of the primary replica capable of read-only operations. The delta replica comprising a copy of the transactional log information of the primary replica but not the data. The system detects a failure of the primary and secondary replicas. The system instantiates a recovery workflow using the delta replica that includes initializing a second secondary replica; causing the second secondary replica to download backup data that represents a state of the primary replica prior to failure of the primary replica; updating the secondary replica using the backup data; and promoting the secondary replica to the primary replica.

20 Claims, 9 Drawing Sheets

(56)      References Cited

U.S. PATENT DOCUMENTS

2013/0290249 A1 *  10/2013  Merriman ............. G06F 16/278
                                                                707/610
2023/0133608 A1     5/2023  Yogesh
2024/0028580 A1 *   1/2024  Zhang ................... G06F 16/235

OTHER PUBLICATIONS

"Multi-master replication", Retrieved from: https://en.wikipedia.org/wiki/Multi-master_replication, Mar. 3, 2023, 6 Pages.

* cited by examiner

Write Quorum = 3
P1 Up   S2 Up   S3 Up   S4 Up
205
Write Quorum = 2
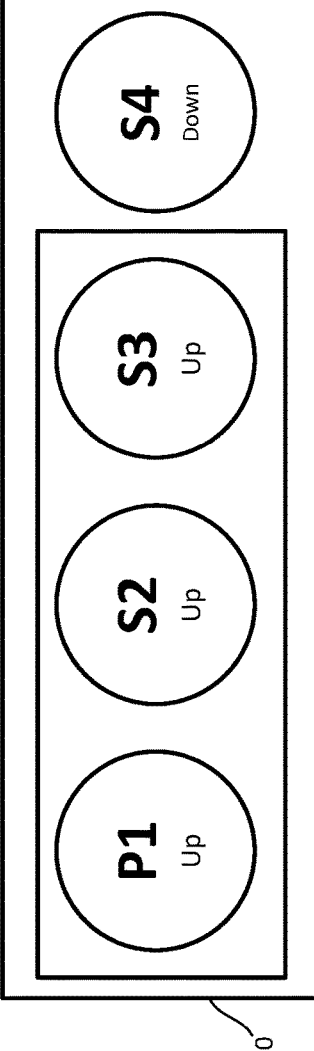
P1 Up   S2 Up   S3 Up   S4 Down
210
Write Quorum = 2
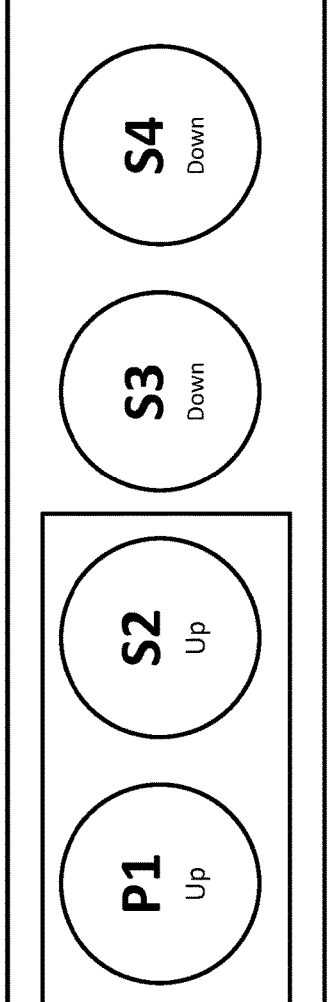
P1 Up   S2 Up   S3 Down   S4 Down
215
FIG. 2

Write Quorum = 3
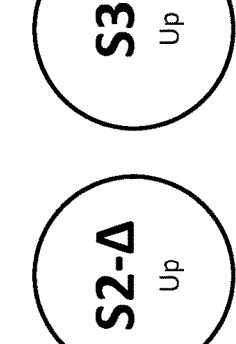
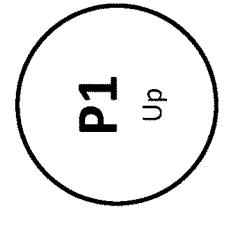
305
Write Quorum = 2
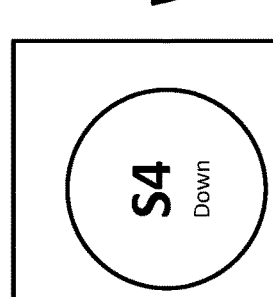
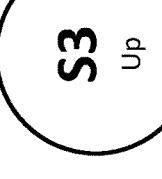
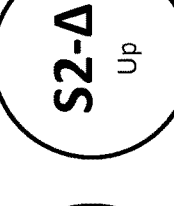
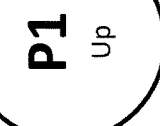
310
Write Quorum = 2
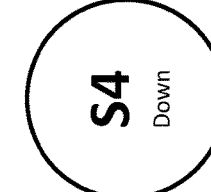
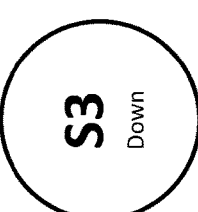
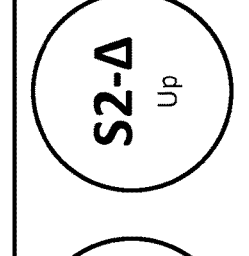
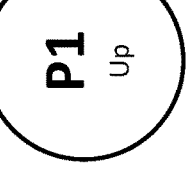
315
FIG. 3

Backup Database

Restore Database

600

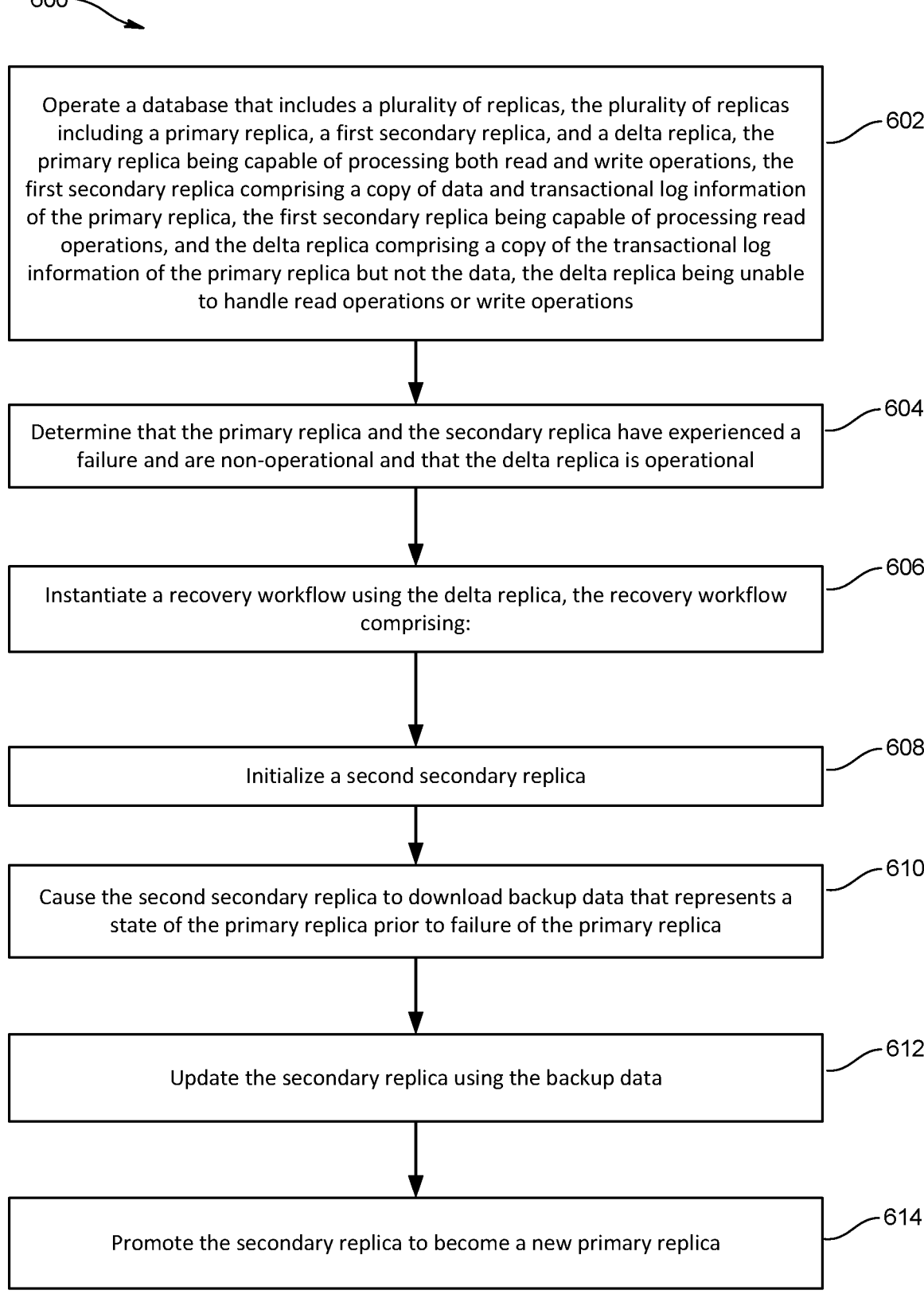

602 Operate a database that includes a plurality of replicas, the plurality of replicas including a primary replica, a first secondary replica, and a delta replica, the primary replica being capable of processing both read and write operations, the first secondary replica comprising a copy of data and transactional log information of the primary replica, the first secondary replica being capable of processing read operations, and the delta replica comprising a copy of the transactional log information of the primary replica but not the data, the delta replica being unable to handle read operations or write operations 604 Determine that the primary replica and the secondary replica have experienced a failure and are non-operational and that the delta replica is operational 606 Instantiate a recovery workflow using the delta replica, the recovery workflow comprising:

608 Initialize a second secondary replica

610 Cause the second secondary replica to download backup data that represents a state of the primary replica prior to failure of the primary replica 612 Update the secondary replica using the backup data 614 Promote the secondary replica to become a new primary replica

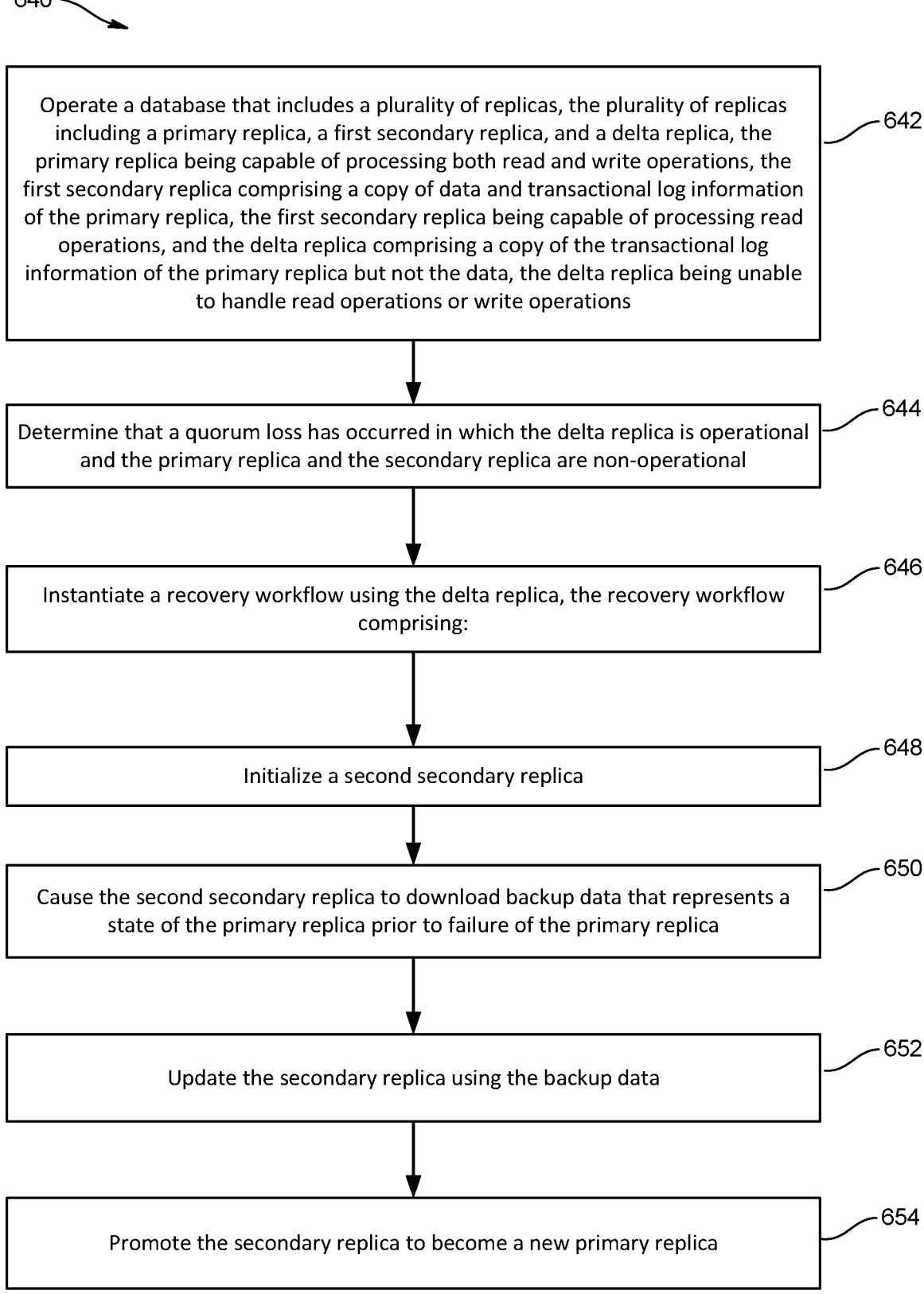

Operate a database that includes a plurality of replicas, the plurality of replicas including a primary replica, a first secondary replica, and a delta replica, the primary replica being capable of processing both read and write operations, the first secondary replica comprising a copy of data and transactional log information of the primary replica, the first secondary replica being capable of processing read operations, and the delta replica comprising a copy of the transactional log information of the primary replica but not the data, the delta replica being unable to handle read operations or write operations — 642

Determine that a quorum loss has occurred in which the delta replica is operational and the primary replica and the secondary replica are non-operational — 644

Instantiate a recovery workflow using the delta replica, the recovery workflow comprising: — 646

Initialize a second secondary replica — 648

Cause the second secondary replica to download backup data that represents a state of the primary replica prior to failure of the primary replica — 650

Update the secondary replica using the backup data — 652

Promote the secondary replica to become a new primary replica — 654

FIG. 6B

WORKFLOW FOR DATABASE SYSTEM RECOVERY USING LOCAL AND BACKED UP RESOURCES

BACKGROUND

Many businesses, governments, universities, and other entities rely on cloud-based computing environments to meet their computing needs. Such cloud-based computing environments may provide these entities with a scalable computing environment for running software utilized with these entities and/or for providing services to customers of these entities. Data storage, access, management, and security are a critical aspect of these cloud-based computing environments, which may be provided by cloud-based database services. Such cloud-based database services may be integrated with cloud-based application services which provide computing resources for implementing and executing cloud-based applications, or the cloud-based database services may be implemented as a separate cloud-base service that provides data storage, access, management, and security for other cloud-based and/or other services that are not cloud-based.

The cloud-based database service may offer service level agreements (SLAs) to customers that provide for uptime guarantees which indicate the availability of the customer's database. To meet these requirements, the cloud-based database service may run multiple replicas of a database for critical applications to eliminate or minimize downtime should an instance of the database go offline. However, such systems require a significant amount of computing resources to support these database replicas. Furthermore, recovering from the failure of a replica can require significant time and computing resources. For at least these reasons, the current approaches to supporting multiple database replicas have numerous shortcomings that significantly impact the effectiveness of these approaches. Hence, there is a need for improved systems and methods for recovering from the failure in a multi-replica database environment.

SUMMARY

An example data processing system according to the disclosure includes a processor and a machine-readable medium storing executable instructions. The instructions when executed cause the processor alone or in combination with other processors to perform operations including operating a database that includes a plurality of replicas, the plurality of replicas including a primary replica, a first secondary replica, and a delta replica, the primary replica being capable of processing both read and write operations, the first secondary replica comprising a copy of data and transactional log information of the primary replica, the first secondary replica being capable of processing read operations, and the delta replica comprising a copy of the transactional log information of the primary replica but not the data, the delta replica being unable to handle read operations or write operations; determining that the primary replica and the secondary replica have experienced a failure and are non-operational and that the delta replica is operational; instantiating a recovery workflow using the delta replica, the recovery workflow comprising: initializing a second secondary replica; causing the second secondary replica to download backup data that represents a state of the primary replica prior to failure of the primary replica; updating the secondary replica using the backup data; and promoting the secondary replica to become a new primary replica.

An example method implemented in a data processing system for provisioning and operating databases includes operating a database that includes a plurality of replicas, the plurality of replicas including a primary replica, a first secondary replica, and a delta replica, the primary replica being capable of processing both read and write operations, the first secondary replica comprising a copy of data and transactional log information of the primary replica, the first secondary replica being capable of processing read operations, and the delta replica comprising a copy of the transactional log information of the primary replica but not the data, the delta replica being unable to handle read operations or write operations; determining that the primary replica and the secondary replica have experienced a failure and are non-operational and that the delta replica is operational; instantiating a recovery workflow using the delta replica, the recovery workflow comprising: initializing a second secondary replica; causing the second secondary replica to download backup data that represents a state of the primary replica prior to failure of the primary replica; updating the secondary replica using the backup data; and promoting the secondary replica to become a new primary replica.

An example data processing system according to the disclosure includes a processor and a machine-readable medium storing executable instructions. The instructions when executed cause the processor alone or in combination with other processors to perform operations including operating a database that includes a plurality of replicas, the plurality of replicas including a primary replica, a first secondary replica, and a delta replica, the primary replica being capable of processing both read and write operations, the first secondary replica comprising a copy of data and transactional log information of the primary replica, the first secondary replica being capable of processing read operations, and the delta replica comprising a copy of the transactional log information of the primary replica but not the data, the delta replica being unable to handle read operations or write operations; determining that a quorum loss has occurred in which the delta replica is operational and the primary replica and the secondary replica are non-operational; instantiating a recovery workflow using the delta replica, the recovery workflow comprising: initializing a second secondary replica; causing the second secondary replica to download backup data that represents a state of the primary replica prior to failure of the primary replica; updating the secondary replica using the backup data; and promoting the secondary replica to the primary replica.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 is a diagram that shows an example configuration that may be implemented by the cloud-based database service shown in FIG. 1.

FIG. 3 is a diagram that shows an example configuration similar to that of FIG. 2 that may be implemented by the cloud-based database service that includes a delta replica.

FIG. 6A is a flow diagram of an example process for provisioning and operating databases.

FIG. 6B is a flow diagram of another example process for provisioning and operating databases.

DETAILED DESCRIPTION

Figure 1:
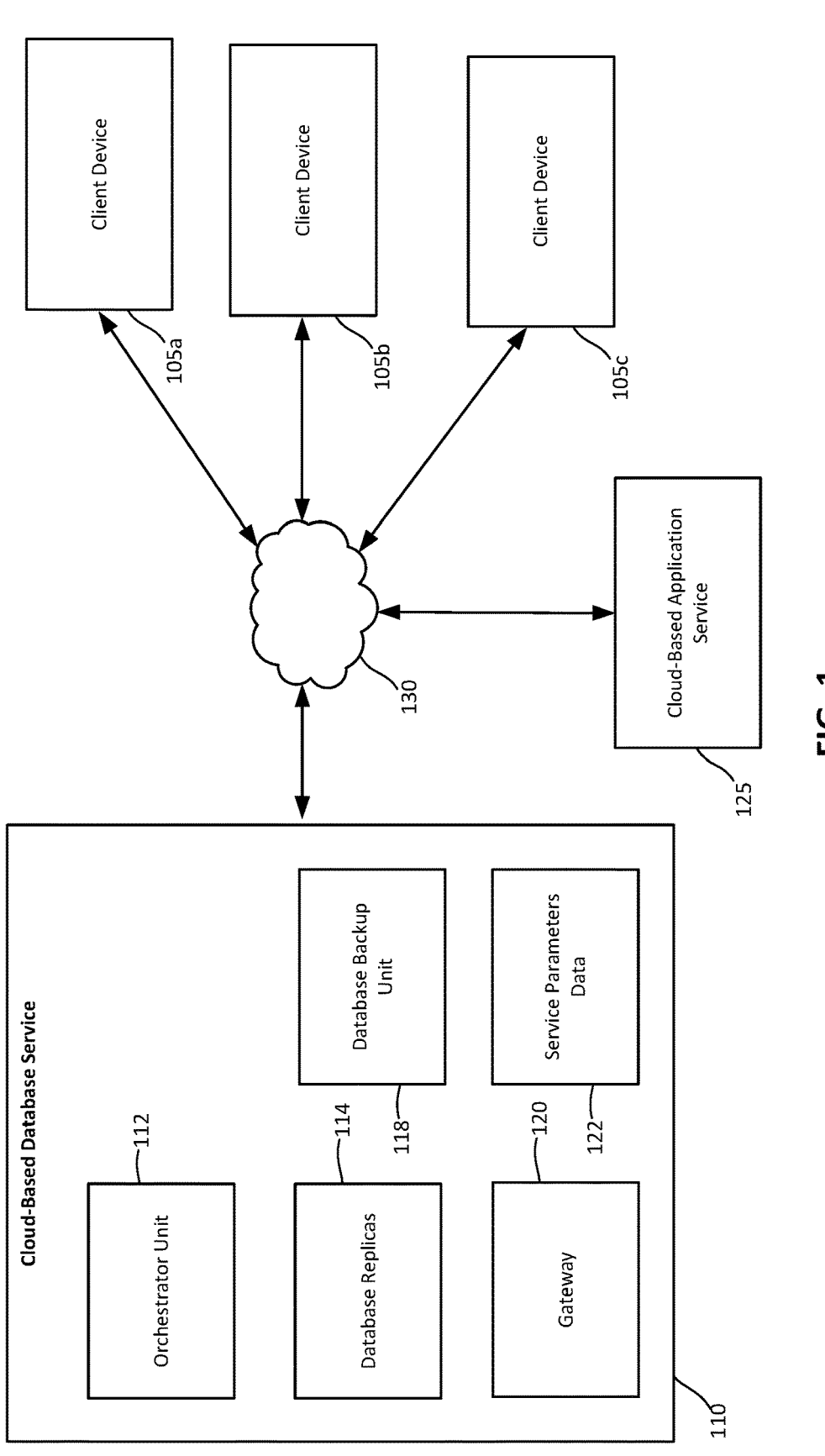
FIG. 1 is a diagram showing an example computing environment in which the techniques disclosed herein may be implemented.

Techniques for recovering using local and backed up data resources in a multiple replica database system are provided. Currently cloud-based database systems provide for redundancy by implementing multiple replicas of a database. These replicas include a primary replica, one or more secondary replicas, and one or more delta replicas. The primary replica supports reading of data from and writing of data to that replica. The secondary replicas are designated as read-only replicas that are continually updated to mirror the data of the primary replica. The delta replicas are lightweight replicas that maintain only the log files that track the changes that have been made to the primary replica but do not include the data contents of the primary replica. The secondary replicas are maintained to ensure that there is at least one replica to serve as a fallback in the event that primary replica experiences a failure. Both the secondary replicas and the delta replicas provide quorum support for handling write transactions to the primary replica. When a write request is received, the write request must be acknowledged by at least predetermined number of replicas of the set of replicas, or the write transaction cannot be committed. The quorum is required to ensure that no data loss occurs should there be a failure of the primary replica, because the replicas have been kept up to date. A technical problem associated with this approach is that each of the secondary replicas consumes substantially the same computing and storage resources as the primary resources, because the secondary replicas are configured to serve as a fallback replica only if the primary replica experiences a failure. Each of the secondary replicas is allocated the same computing and memory resources as the primary replica. However, most of these replicas will never be required to take over as the primary replica in the event of a failure. Consequently, a significant amount of computing resources and memory allocated to the second replicas often remain unutilized. The use of the delta replica may significantly reduce the computing and storage requirements required to support the replicas while still providing the quorum requirements for ensuring the data integrity in the event of a failure of the primary replica. However, in current systems, if the primary and secondary replicas experience a failure, there is no way for a delta replica to be used for recovery because the delta replica does not include a full back up of the data from the primary replica like the secondary replicas.

The techniques herein provide a workflow that solves the technical problems associated with recovery from a delta replica by utilizing local resources from the delta replica and backed-up data resources stored in a persistent memory of the cloud-based database service. The backed-up data resources includes transaction log data that represents writes operations that were made to data in the primary replica. The backed-up data resources are only updated periodically and may only include a subset of the data included in primary replica. To remedy this issue, local data from the delta replica is used to supplement the backed-up log data to ensure that no data loss occurs. The delta replica utilizes the backed-up log data and the local data to facilitate the creation of a new secondary replica. Once the secondary replica has been brought online, the secondary replica is designated as the primary replica, and the new primary replica can then create one or more secondary replicas and or one or more delta replicas using the current techniques. A technical benefit of this approach is that the multi-replica database can be restored from the delta replica in the event of a failure of the primary and secondary replicas. Consequently, the cloud-based database service can benefit from the reduced computing and storage requirements of delta replicas, which facilitating both the quorum requirements that ensure data integrity is maintained during write operations and database recovery in the event of the failure of the primary and secondary replicas. These and other technical benefits of the techniques disclosed herein will be evident from the discussion of the example implementations that follow.

FIG. 1 is a diagram showing an example computing environment 100 in which the techniques disclosed herein for database recovery in a multi-replica database system. The computing environment 100 include a cloud-based database service 110, a cloud-based application service 125, and client devices 105*a*, 105*b*, and 105*c*. The cloud-based application services 125 and the client devices 105*a*, 105*b*, and 105*c* communicate with the cloud-based database service 110 via the network 130. The network 130 may be implemented by one or more public networks, one or more private networks, or a combination thereof, and the network 130 may be implemented at least in part by the Internet.

In the example shown in FIG. 1, the cloud-based database service 110 is implemented as a set of cloud-based services or set of services. The cloud-based database service 110 is configured to provide a scalable relational database service that provides scalable computing and storage resources. The cloud-based database service 110 provides data storage, access, management, and security for customers. The customers may require a high level of availability to their data, and the cloud-based database service 110 utilizes replica databases to provide redundancy in the event of failure of the primary database. The database replicas 114 include a primary replica, one or more secondary replicas, and one or more delta replicas for each database implement on the cloud-based database service 110. The primary replica handles read-write queries. The secondary replicas and the delta replicas remain synchronized with the primary replica. The secondary replicas maintain a synchronized copy of the data of the primary replica, while the delta replicas maintain only the log files that track the changes that have been made to the primary replica but not the actual database contents.

A database, as used herein, refers to a computerized system for collecting, organizing, storing, accessing, and manipulating information electronic data. The database includes software components for implementing various aspects of the functionality of the database. The database also includes electronic data of various types and various tables and/or other data structures for organizing and storing the data. The cloud-based database service 110 allocates memory, storage, and computing resources to support the database one or more clusters of database servers. The cloud-based database service 110 typically supports multiple databases associated with multiple customers that subscribe to the services provided by the cloud-based database services 110 for provisioning and supporting databases. As discussed above, the cloud-based database service 110 uses replicas to support recovery in the event of a failure and to provide quorum support. A database replica, as used herein, refers to an electronic copy of an instance the database that includes a copy of the data, the structure of the tables and/or other data structures, transaction logs, and/or elements of the database. The contents of the replica depend at least in part on the type of replica as will be discussed in greater detail in the examples which follow. The cloud-based database service 110 typically allocates memory, computing, and storage resources on separate database servers within a database cluster and/or on separate database clusters to ensure that multiple replicas are not impacted by a hardware failure on a server.

Transactional log, as used herein, refers to an electronic file associated with a database replica that records transactions and modifications to the database data by these transactions. The transactional log is stored in one or more files in a persistent memory of the database server allocated to the replica. The format of the transactional log may vary from implementation to implementation. The primary replica writes to the transactional log sequentially as transactions are performed on the primary replica. The transactional log is written to sequentially to ensure that the order of operations performed on the primary replica can be reproduced if necessary to update a secondary replica or delta replica. The transactional log record includes a log sequence number that increases sequentially as records are added to the transactional log. The transaction log records can include other information such as an identifier of a transaction associated with the record. The transaction identifier indications which records are associated with a particular transaction and help facilitate rollbacks of the transaction. A read operation, as used herein, refers to an operation in which data is retrieved from one or more tables or other data structures of the primary replica or a secondary replica. A read operation does not alter the data contained in the database. A write operation, as used herein, refers to an operation that alters the content of the database. The write operation may add, delete, or modify data in the database. The write operation may also alter one or more tables and/or other data structures of the database.

Figure 4:
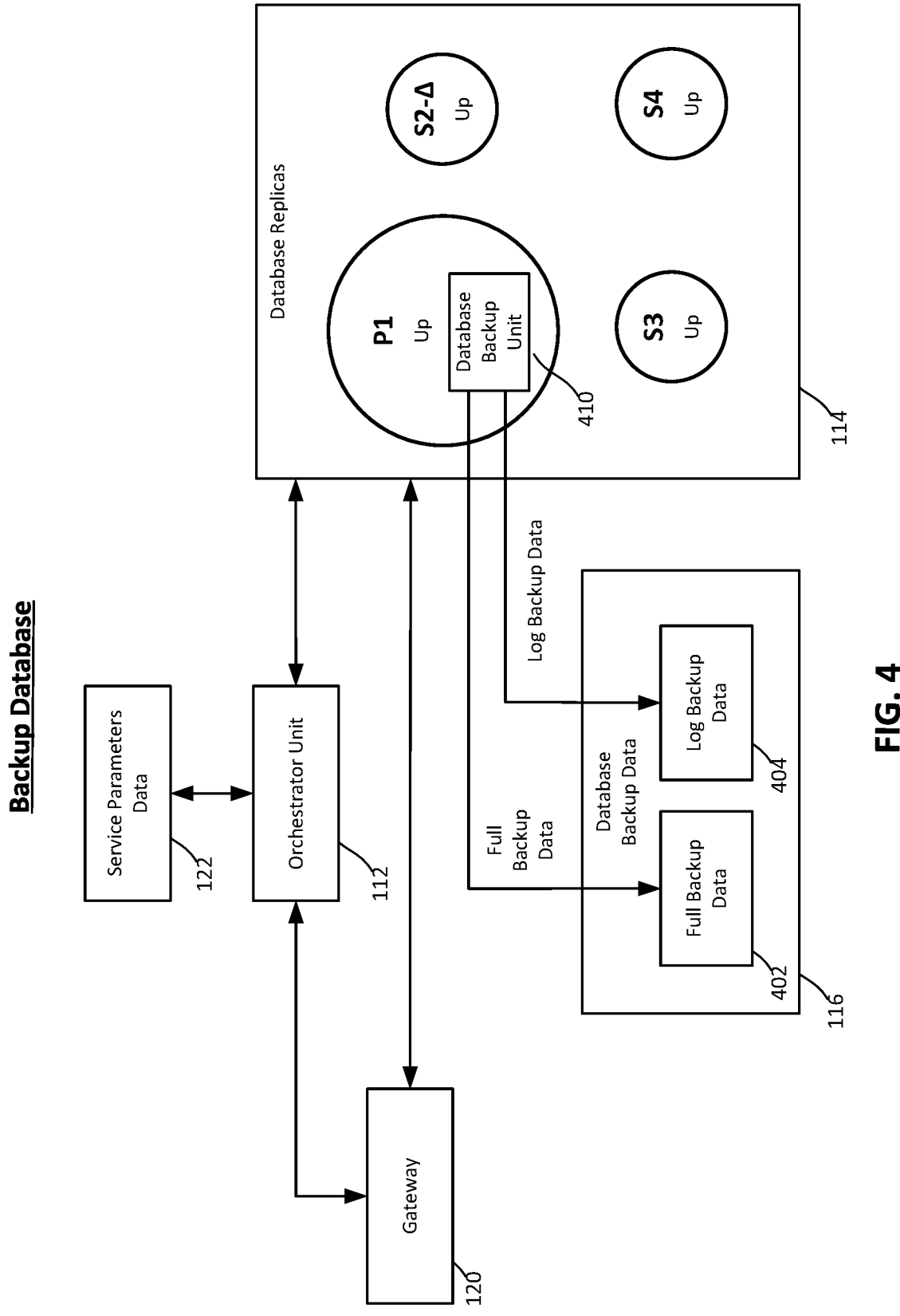
FIG. 4 is a diagram that shows a workflow for backing up a database that includes replicas.
Figure 5:
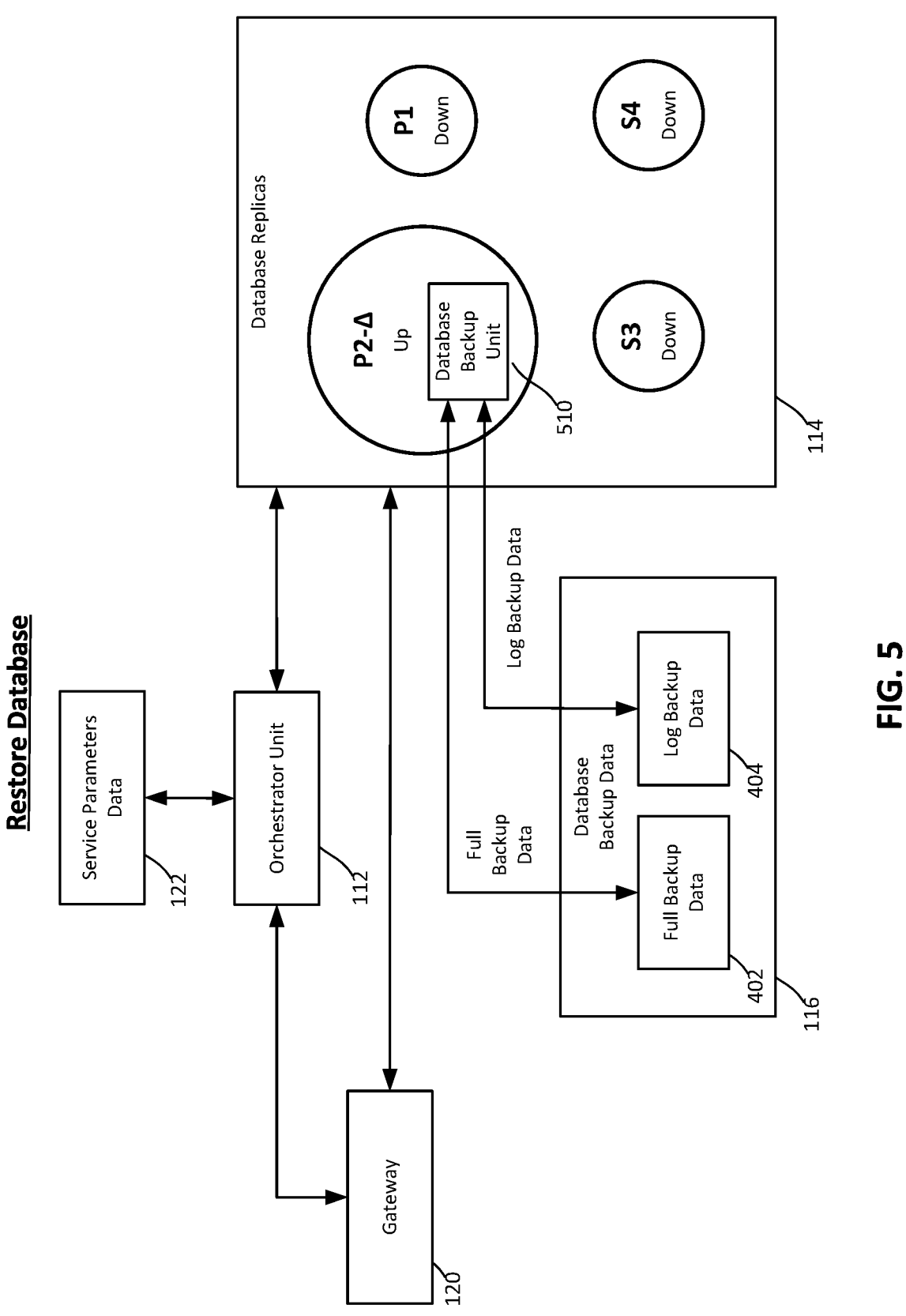
FIG. 5 is a diagram that shows a workflow for restoring a database that includes at least one delta replica.

The secondary and delta replicas provide support for quorum commits. Quorum commit requires a threshold minimum number of replicas to acknowledge an update before a write transaction can be committed. The service parameters 122 include a minimum replica set size parameter that indicates the minimum number of replicas required for quorum commit. The secondary and delta replica also facilitate recovery from a failure of the primary replica. A secondary replica can be promoted to a primary replica and the newly prompted primary replica can facilitate recovery of the former primary replica as a secondary replica. However, a delta replica cannot be prompted to primary replica because the delta replicas do not include a copy of the database data like the secondary replicas. The techniques herein provide a recovery workflow, described in detail in the examples which follow, that enable the cloud-based database service 110 to recover from a quorum loss in which the primary and secondary replicas are unavailable but at least one delta replica remains operational. FIGS. 2 and 3 provide examples that demonstrate how the primary, secondary, and delta replicas can be used to provide quorum support. FIGS. 4 and 5 provide examples of backing up data and recovering from quorum loss using a delta replica.

The database backup data 116 is used to store backup data that can be used to recover from quorum loss resulting from the failure of one or more replicas of a database. The database backup data 116 includes full backup data that represents a snapshot of the data included in the primary replica at the time that the full backup is performed. The full backup data may include some transaction log data that is used to help restore a copy of the database using the full backup data. The database backup data 116 also includes transactional log backups that backs up writes to specific resources associated with the database and uploads the updates to the log backup data. The transactional log backup data can be used to restore a replica of the database to the state of the primary replica prior to the failure. The transactional log backup data can be used when the primary replica continued to be updated by write transactions after the full backup was performed. Thus, the full backup and the transactional log backup data can be used to prevent or reduce data loss in the event of a failure of the primary replica and some of the secondary replicas. In some implementations, the log backup data is stored as chunks of data in blob storage. Blob storage is a used to store unstructured data, which can be accessed over a network using HTTP/HTTPS protocols. Each blob is associated with a Uniform Resource Identifier (URI) that can be used by the cloud-based database service 110 to reference the blobs comprising the log backup data during a database recovery. The backup data associated with different tenants of the cloud-based database service 110 is stored in a container associated with that tenant to prevent data from one tenant from being accessible to other tenants of the cloud-based database service 110. The size of the chunks of data included in each of the blobs of log backup data may vary depending upon the implementation. For example, some implementations create a new blob for each 500 megabytes (MB) of log backup data. As will be discussed in greater detail with respect to FIGS. 4 and 5, the primary replica is configured to store the backup data included in the database backup data 116.

The orchestrator unit 112 is configured to access the service parameters 122 for a customer and to facilitate the allocation of computing resources to the database replicas 114. The orchestrator unit 112 identifies the database servers and/or server clusters that have the computing and storage capacity to support the database replicas 114. The orchestrator unit 112 allocates the replicas to different database servers and/or server clusters so that a hardware failure or other issue that impacts a particular database server and/or server cluster does not cause a simultaneous failure of all of the database replicas 114. The orchestrator unit 114 stores an address of each of the replicas in the service parameters data 122 or another persistent datastore of the cloud-based database service 110.

The orchestrator unit 112 monitors the status of the primary, second, and delta replicas of the database replicas 114. The orchestrator unit 112 triggers various recovery processes in response to a failure of the primary replica, one or more secondary replicas, and/or one or more delta replicas in some implementations. In other implementations, the primary replica or other surviving replica initiates the recovery processes and the orchestrator unit 112 facilitates the allocation of computing resources for newly created replicas. As will be discussed in greater detail with respect to FIGS. 2 and 3, the orchestrator unit 112 monitors the database replicas 114 to ensure that the quorum requirements including the minimum replica set size defined in the service parameters 122 are maintained. The minimum replica set size may specify a minimum number of secondary and/or delta replicas that may be implemented for a particular database.

The gateway 120 provides an interface for the client devices 105a, 105b, and 105c and/or the cloud-based application services 125 to facilitate queries to the databases maintained by the cloud-based database service 110. The gateway 120 is associated with a public internet protocol (IP) address and listens for connection requests from the client devices 105a, 105b, and 105c and/or the cloud-based application services 125.

The gateway 120 receives queries from the client devices 105a, 105b, and 105c and determines which replica associated with a particular database is capable of executing the query. The gateway 120 obtains replica information from the orchestrator unit 112 including the replica type and network addresses. The gateway 120 then determines which replica is capable of handling the query and routes the query to the selected replica for execution. Read-write queries can be handled by the primary replica. Either the primary replica or the secondary replicas can handle read-only queries. The gateway 120 routes write queries to the primary replica if the primary replica is available. The gateway 120 selects a replica from among the primary and one or more secondary replicas to handle a read-only query and routes the query to the selected replica. The gateway 120 may select the replica to handle the read-only queries based on loading of the primary and secondary replicas. The secondary replicas can help reduce the load on the primary replica by handling the read-only queries. A technical benefit of this approach is that the primary replica can then allocate more resources to completing write queries and for keeping the secondary and delta replicas synchronized in response to the write queries updating the data in the primary replica.

The cloud-based application service 125 provides one or more cloud-based applications that may utilize the cloud-based database service 110 for data management. The cloud-based application service 125 can implement various types of cloud-based applications, such as but not limited to communications platforms, social media platforms, collaboration platforms, file management platforms, data analysis tools, online stores or exchanges, and/or other types of applications that may generate and/or rely upon large amounts of data and the continued availability, security, and integrity of that data. Whereas the cloud-based application service 125 and the cloud-based database service 110 are shown as separate services in FIG. 1, the functionality of the cloud-based application service 125 is combined with that of the cloud-based database service 110 in some implementations to provide a comprehensive platform for implementing cloud-based applications and data storage.

The client devices 105a, 105b, and 105c are computing devices that can be implemented as a desktop computer, a laptop computer, a computer server and/or other type of computing device configured to communicate with the cloud-based application service 125 and/or the cloud-based database service 110 via the network 130. The client devices 105a, 105b, and 105c may by implemented as a portable electronic device, such as but not limited to a smart phone, a tablet computer, and/or other such devices. While the example implementation illustrated in FIG. 1 includes three client devices, other implementations may include different client devices that may utilize the services provided by the cloud-based application service 125 and/or the cloud-based database service 110. Furthermore, in some implementations, the portion of the application functionality provided by the client devices 105a, 105b, and 105c may be implemented by a native application installed on the client devices 105a, 105b, and 105c, and the client devices 105a, 105b, and 105c may communicate directly with the cloud-based database service 110 over a network connection.

FIGS. 2 and 3 are diagrams showing example database configurations that may be implemented by the cloud-based database service 110. FIG. 2 shows an example implementation operating without a delta replica. The cloud-based database service 110 provides an interface that enables a developer of the database service to configure the service parameters 122. The service parameters 122 include a minimum replica set size parameter that indicates a minimum number of replicas required for quorum commit and target replica set size parameter that indicates how many replicas should be created for the database. The service parameters 122 also include a delta replica limit, which indicates how many of the replicas may be delta replicas. In the example shown in FIG. 2, the delta replica limit is set to two, which means that the cloud-based database service 110 can utilize secondary replicas to satisfy the quorum requirements but not delta replicas. The number of active replicas may decrease in response to a replica experiencing a hardware failure or other condition requiring the replica to be shut down. The number of active replicas also decrease in response to a replica being taken down for maintenance or upgrade. If the total number of replicas drops below the majority quorum of the minimum replica count, then further writes will be disallowed.

In the example shown in FIG. 2, a database has been allocated with a target replica size of 4, indicating that there are four replicas of the database to be operating: a primary replica P1, and three secondary replicas S2, S3, and S4. Should the primary replica P1 go down due to hardware failure or other problems, one of the secondary replicas S2, S3, or S4 is to be promoted to primary and the former primary P1 is repaired and restarted as a secondary replica. Whereas this example shows three secondary replicas, other implementations may include a different number of secondary replicas. In this example, the database has also been allocated with a minimum replica set size of 3, indicating that if the total number of replicas falls below 3, then further writes will be disallowed.

The primary replica P1 is allocated for handling read-write traffic, and the secondary replicas S2, S3, and S4 are synchronized with the primary replica P1 to provide quorum support. The primary replica P1 processes the read-write requests and generates a transaction log, and the transactional log is propagated to each of the secondary replicas S2, S3, and S4. Once each of the secondary replicas S2, S3, and S4 have accepted the transactional log from the primary replica P1, the primary replica P1 commits the transaction in response to the acknowledgements from the secondary replicas S2, S3, and S4, and the primary replica P1 commits a log truncation after committing the transaction. The primary replica P1 no longer requires the full log once the transaction has been committed and truncates the transactional log. The truncation is then propagated to the secondary replicas S2, S3, and S4. Consequently, the secondary replicas S2, S3, and S4 will include a delta of the transaction log file and not the full translational log file.

One or more of the secondary replicas may also be allocated to handle read-only traffic to take some of the load off the primary replica P1. The secondary replicas may be allocated to handle read-only traffic since the secondary replicas are synchronized with the primary replica P1. Write traffic is not permitted on the secondary replicas to prevent the secondary replicas from becoming unsynchronized with the primary replica P1.

Initially, at a time 205, all four of the replicas are operational. The cloud-based database service 110 may calculate a write quorum value for the database based on the number of operational replicas. In the example shown in FIG. 1, the write quorum may be determined by the following equation:

$$\text{Write Quorum} = \frac{\text{Replica Count}}{2} + 1,$$

where the replica count represents the current number of active replicas of a database. At time 205, there are 4 active replicas, so the write quorum=3. The write quorum rounds down to the nearest integer value.

At time 210, the secondary replica S4 has gone down and is not currently operational. The replica may have failed due to a hardware failure or may have been taken down for maintenance or an upgrade. As a result, the write quorum decreases to two, because the write quorum rounds down to the nearest integer value. Three replicas continue to operate. A sufficient number of replicas are available for quorum and at least one of the secondary replicas may still be allocated for handling read traffic to take some of the load off the primary replica P1.

At time 215, the secondary replica S3 has also gone down leaving two non-operational secondary replicas. The primary replica P1 and the secondary replica S2 remain operational. The write quorum remains at two, the minimum for maintaining a quorum. The number of active replicas has also fallen below the minimum replica set size. The cloud-based database service 110 will attempt to bring the number of active replicas back to the target replica set size. If neither of the secondary replicas S3 and S4 can be brought back online, the secondary replica S2 may be used as a seed to provision a new replica. However, provisioning a new replica requires the allocation of additional computing and memory resources to provision the new replica. Therefore, restoring an existing replica that has gone down is preferable.

In the example shown in FIG. 2, the quorum is maintained even though a couple of the secondary replicas failed. However, if quorum loss occurred and there were not a sufficient number of operational secondary replicas to support a write transaction, the database would be taken down. Users would not be able to connect to the database, and the gateway 120 would disable access the database until a sufficient number of replicas can be brought back up to an online state.

FIG. 3 is a diagram that shows an example of another database configuration similar to that of FIG. 2 that may be implemented by the cloud-based database service 110 that includes a delta replica instead of one of the secondary replicas. The service parameters 122 include a delta replica limit, which indicates how many of the replicas instantiated by the orchestrator unit 112 may be delta replicas. The service parameters 122 include a minimum replica set size parameter that indicates a minimum number of replicas required for quorum commit and target replica set size parameter that indicates how many replicas should be created for the database. The delta replica limit will be less than or equal to the target replica set size for the database. The example shown in FIG. 3 includes a single delta replica, but other implementations may include more than one delta replica.

In the example shown in FIG. 3, the database has been allocated with a target replica size of 4, indicating that there are four replicas of the database to be operating: a primary replica P1, a delta replica S2-Δ, and two secondary replicas S3 and S4. The database has also been allocated with a minimum replica set size of 3, indicating that at least three replicas should be kept running, and a delta replica limit of 1, indicating that one of the replicas may be a delta replica. Other implementations may include different minimum replica set size and a different number of secondary and/or delta replicas. The primary replica P1 is allocated for handling read-write traffic, and the delta replica S2-Δ and secondary replicas S3 and S4 are synchronized with the primary replica P1 to provide quorum support. The primary replica P1 processes the read-write requests and generates a transaction log, and the transactional log is streamed to each of the replicas S2-Δ, S3, and S4.

Unlike the example shown in FIG. 2, only the secondary replicas S3 and S4 may be allocated to handle read-only traffic to take some of the load off the primary replica P1 if the primary replica reaches a predetermined load threshold. This threshold may be configurable for each database and may depend in part how much write traffic and how much read-only traffic is expected for the database. The secondary replicas S3 and S4 may be allocated to handle read-only traffic since the secondary replicas are synchronized with the primary replica P1. However, the delta replica S2-Δ cannot be utilized for either read-write or read-only traffic. The delta replica S2-Δ includes only the transactional log data from P1 and is not a full replica of the data stored in P1. Therefore, the delta replica S2-Δ may be used for quorum support but cannot be utilized for read-only traffic, nor can the delta replica S2-Δ be converted to the primary replica if the primary replica P1 goes down. However, the delta replica S2-Δ utilizes significantly less computing and storage resources than the secondary replicas S3 and S4. The differences between the allocation of resources of a full secondary replica and a delta replica are discussed in greater detail with respect to FIGS. 4 and 5. The orchestrator unit 112 can convert one of the secondary replicas S3 and S4 to the primary replica in response to the primary replica P1 becoming non-operational. The orchestrator unit 112 can convert the delta replica S2-Δ to the primary replica in response to the primary replica P1 and the secondary replicas becoming non-operational. A separate database recovery workflow is described herein for recovering from a delta replica instead of a secondary replica, such as the delta replica S2-Δ, because the delta replicas only include the transactional log data to provide quorum support.

Initially, at a time 305, all four of the replicas are operational. The write quorum is 3 and may be calculated in a similar manner as discussed with respect to FIG. 2. The delta replica S2-Δ counts for quorum purposes, as the delta replica includes the transaction log information associated with the primary replica P1 and can be used to recover the state of P1 if necessary.

At time 310, the secondary replica S4 is down and non-operational. Again, the secondary replica S4 may have gone down due to a hardware failure or may have been taken down for maintenance or an upgrade. As a result, the write quorum decreases to two, because the write quorum rounds down to the nearest integer value. Three replicas continue to operate, including the primary replica P1 and the delta replica S2-Δ. A sufficient number of replicas are available for quorum and the secondary replica S3 may still be allocated for handling read traffic to take some of the load off the primary replica P1. However, the delta replica S2-Δ cannot handle read-only traffic to take some of the load off the primary replica P1.

At time 315, the secondary replica S3 has also gone down and is non-operational. The primary replica P1 and the delta replica S2-Δ remain operational. The write quorum remains at two, the minimum for maintaining a quorum. The number of active replicas has also fallen below the minimum replica set size. The cloud-based database service 110 will attempt to bring at least one of the secondary replicas S3 and S4 back online. If neither of the secondary replicas S3 and S4 can be brought back online, the primary replica P1 and/or the delta replica S2-Δ may be used as a seed to provision a new replica. However, provisioning a new replica requires the allocation of additional computing and memory resources to provision the new replica. Therefore, restoring an existing replica that has gone down is preferable. As discussed in the examples which follow, the cloud-based database service 110 implements a workflow that enables the delta replica S2-Δ to be used to implement a full replica of P1 that take over as primary while P1 is recovered and restarted as a secondary replica. The orchestrator unit 112 may also recover secondary replicas S3 and/or S4 and/or may implement one or more new delta replicas so that a quorum can be maintained. The orchestrator unit 112 determines how many secondary replicas and/or delta replicas to provision based on the service parameters 122.

FIG. 4 is a diagram that shows a workflow for backing up a database that includes replicas. The backup is performed as the database is operational and is servicing queries. The queries may originate from a native application on the client devices 105a-105c, a web application implemented by the cloud-based application services 125, or a web application implemented by the cloud-based database service 110. The web applications may be accessed by a browser application on the client devices 105a-105c. The gateway 120 obtains replica information from the orchestrator unit 112 and routes write queries to the primary replica P1, and routes read-only queries to the primary replica P1 or one the secondary replicas S3 and S4.

As discussed in the preceding examples, the secondary replicas S3 and S4 maintain a synchronized copy of the data of the primary replica P1, while the delta replica S2-Δ maintains only the log files that track the changes that have been made to the primary replica P1 but not the actual database contents. The database backup unit 410 of the primary replica P1 also maintains backups of the primary replica P1 that can be used to recover from a failure of the primary replica of the database. The database backup unit 410 is implemented by a process or processes running on the primary replica P1. The database backup unit 402 stores the full backup data from the primary replica Plas full backup data 402 in the database backup data 116. The database backup unit 410 also obtains log backup data from the primary replica in some implementations, and the database backup unit 410 stores the log backup data as log backup data 404 in the database backup data 116. The full backup data 402 includes all of the data from the primary replica P1 of the database as well as the transactional log files. The database backup unit 410 periodically obtains a snapshot of the primary replica P1 and updates the full backup data 402. The database backup unit 410 also obtains log backup data from the primary replica that backs up writes to specific resources associated with the primary replica P1. The database backup unit 410 stores the log backup data as the log backup data 404 in the database backup data 116. The database backup unit 410 continues to update the database backup data 116 as the database continues to process queries.

FIG. 5 is a diagram that shows a workflow for restoring a database that includes at least one delta replica. In the example implementation shown in FIG. 5, the primary replica P1 and the secondary replicas S3 and S4 are down and non-operational. The orchestrator unit 112 coordinates restoration workflow to facilitate restoration of the database from a delta replica, such as the delta replica S2-Δ.

The current approach to database restoration requires either the primary replica or a secondary replica to remain operational. If the remaining operational replica is a secondary replica, the orchestrator unit 112 management unit promotes the secondary replica to be the primary replica. The primary replica then instantiates one or more secondary replicas and/or one or more delta replicas. The primary replica performs a full backup and the full backup data 402 is streamed to each of the secondary replicas. The primary replicas synchronizes just the logs with each of the one or more delta replicas. Once a sufficient number of replicas are operational, the orchestrator unit 112 brings the database back online. The primary replica can then begin receiving read and/or write requests and the secondary replicas can begin receiving read requests. The gateway 120 routes the queries to one of the replicas for processing.

A modified recovery workflow is provided herein for instance in which a single delta replica, such as the delta replica S2-Δ, remains operational. In such instances, the orchestrator unit 112 promotes the delta replica S2-Δ (shown in FIG. 4) to primary replica P2-Δ. In such instances, the primary delta replica P2-Δ facilitates the creation of a secondary replica using the modified recovery workflow, and the secondary replica is promoted to the primary replica.

The orchestrator unit 112 sends an indication to the gateway 120 that the database is offline. The database is not capable of handling write queries because the primary reference P1 is down, nor could the database handle any read-only queries because the secondary replicas S3 and S4 are also down. The delta replica P2-Δ is unable to support either type of query or primary provides quorum support. The gateway 120 provides an indication to the native application and/or the web application from which the query originated that the query cannot be executed because the database is unavailable.

In a first phase of the recovery workflow, the orchestrator unit 112 sends an instruction to the delta replica S2-Δ to temporarily promote the delta replica to primary delta replica P2-Δ to build a new secondary replica to be promoted to be the primary replica. The primary delta replica P2-Δ first checks whether the database backup data 116 includes the full backup data 402 is available. In some implementations, the database backup unit 510 of the primary delta replica P2-Δ accesses the database backup data 116 to determine whether the full backup data 402 is available and obtains a URI for the full backup data 402. If the full backup data 402 is available, the primary delta replica P2-Δ requests that the orchestrator unit 112 instantiate a new secondary replica on a database server of the cloud-based database service 110. The primary delta replica P2-Δ then instructs the secondary replica to download and install the full backup data 402 using the URI associated with the full backup. The primary delta replica P2-Δ and/or the orchestrator unit 112 determine whether the secondary replica is caught up to the state of the former primary replica. This determination can be made by determining whether there is any log backup data 404 and/or data in the log buffer of the primary delta replica P2-Δ that indicate that data was written to the primary replica since the full backup data 402 was captured. If the primary delta replica P2-Δ determines that the secondary replica is not completely up to date, the primary delta replica P2-Δ continues the update process using the second phase described below.

If the secondary replica is up to date, the secondary replica provides an indication to the orchestrator unit 112 that the secondary replica has been instantiated and is up to date. The orchestrator unit 112 promotes the secondary replica to the primary replica and the delta replica P2-Δ temporarily serving as primary replica is reassigned to delta replica status again (S2-Δ). The newly instantiated primary replica then utilizes the current approach described above to instantiate one or more secondary replicas and/or one or more delta replicas based on the service parameters 122.

In the second phase of the recovery workflow, the new secondary replica is caught up to the state of the primary replica if the secondary replica was not fully up to date. In the second phase of the recovery workflow, the primary delta replica P2-Δ downloads the log backup data 404 chunk by chunk from the database backup data 116. The primary delta replica P2-Δ also accesses the log buffer of the primary delta replica P2-Δ to determine whether there are any transactions that have not yet been applied to the secondary replica. As discussed above, the full backups are performed periodically. Therefore, the full backup data 402 may not represent the current state of the former primary replica P1 at the time that the replica went offline. As previously discussed, the transaction logs included in the log backup data 404 may only include a subset of the write activity to the former primary replica P1. The log buffers from the primary delta replica P2-Δ include information indicating the other write activity that has taken place on the former primary replica P1. The primary delta replica P2-Δ analyzes the transaction logs from the log buffer and the log backup data 404 to determine an order in which the transactions should be applied. Based on the global ordering information associated with the transaction logs in the log buffer and the log backup data 404, the primary delta replica P2-Δ determines the order in which the transactions from each of these sources should be applied to the secondary replica. The primary delta replica P2-Δ checks the transactions in the transaction logs in the log buffer and the log backup data 404 to ensure that the transactions are being executed in the same order on the secondary replica as the transactions were executed on the former primary replica P1 to ensure that the secondary replica built using the recovery workflow accurately represents the state of the primary replica P1.

Once the primary delta replica P2-Δ completes the updates to the new secondary replica, the orchestrator unit 112 promotes the newly created secondary replica to be the new primary replica and the delta replica P2-Δ temporarily serving as primary replica is reassigned to delta replica status again (S2-Δ). The orchestrator unit 112 then continues building additional secondary replicas and/or delta replicas as indicated in the service parameters 122. The replicas are typically implemented on a cluster of database servers of the cloud-based database services 110 on which the computing and storage resources needed to support the replicas have been allocated to support the database.

In some implementations, the orchestrator unit 112 issues a create database statement to the cluster of database servers that specifies the target replica set size and a minimum replica set size for the database. The create database statement can also specify how many delta replicas may be created and is a value up to the delta replica limit discussed in the preceding examples. In other implementations, the create database request does not include a reference to the number of delta replicas. Instead, the database server determines a service level associated with a customer associated with the request to create the database. The database server accesses the service parameters information 122 to determine the service level to be provided to the customer. Some service levels may permit the use of delta replicas, while other may not permit the use of delta replicas. The database server determine how many delta replicas may be utilized for the recovered database based on this service level information. A technical benefit of this approach is that the quorum requirements for ensuring data integrity may be satisfied by implementing one or more delta replicas without having to allocate the full resources required by secondary replicas. This reduction in computing resources is significant for a single database running multiple copies but is even more significant for a cloud-based database service, such as the cloud-based database service 110, which may be running large numbers of databases having multiple replicas.

FIG. 6A is a flow chart of an example process 600 for provisioning and operating databases that may be implemented by the cloud-based database service 110 described in the preceding examples.

The process 600 includes an operation 602 of operating a database that includes a plurality of replicas. The plurality of replicas includes a primary replica, a first secondary replica, and a delta replica. The primary replica is capable of processing both read and write operations. The first secondary replica includes a copy of data and transactional log information of the primary replica. The first secondary replica is capable of processing read operations but not write operations. The delta replica includes a copy of the transactional log information of the primary replica but not the data from the primary replica. The delta replica being unable to handle read operations or write operations.

The process 600 includes an operation 604 of determining that the primary replica and the secondary replica have experienced a failure and are non-operational and that the delta replica is operational. As discussed in the preceding examples, the typically the primary replica of the database would instantiate one or more secondary replicas and/or delta replicas in response to such as failure. In instances in which the primary replica has failed, a secondary replica can instead be promoted to primary, and the new primary replica then instantiates one or more secondary replicas and/or delta replicas based on the service parameters information 122.

The process 600 includes an operation 606 of instantiating a recovery workflow using the delta replica. The recovery workflow includes the operations 608, 610, 612, and 614. As discussed above, the recovery workflow can be used to recover from a database failure in which the primary replica and secondary replicas are inoperable but there is at least one delta replica that is operational. The delta replica executes the recovery workflow to create a new secondary replica that can be promoted to the primary replica.

The process 600 includes an operation 608 of initializing a second secondary replica and an operation 610 of causing the second secondary replica to download backup data that represents a state of the primary replica prior to failure of the primary replica. The delta replica causes the secondary replica to download the full backup data 402 from the database backup data 116.

The process 600 includes an operation 612 of updating the secondary replica using the backup data. The secondary replica uses the full backup data 402 to update the secondary replica to the state of the primary replica at the time that the full backup of the primary replica was captured. The delta replica can also perform additional updates on the secondary replica using the log backup data 404 and log buffers from the delta replica. The delta replica determines the order that the transactions included in the log backup data 404 and log buffers should be applied so that the order of the write operations in these two data sources are performed in the same order that the were originally performed on the primary replica. A technical benefit of this approach is that the delta replica is able to use the log backup data 404 and log buffers to update the secondary replica to the state of the primary replica before the failure occurred. The full backup data 402 is only updated periodically.

The process 600 includes an operation 614 of promoting the secondary replica to become a new primary replica. Once the secondary replica has been updated to the state of the primary replica prior to the failure of the primary replica, the secondary replica is then promoted to the primary replica. The new primary replica can then instantiate one or more secondary replicas and/or one or more delta replicas according to the service parameters information 122. In some implementations, the primary replica may instead rely on the delta replica to utilize the recovery workflow to instantiate the one or more secondary replicas rather than relying on the primary replica to instantiate the secondary replicas. This approach can be utilized to reduce the load on the primary replica. This can be especially useful for reducing the load on the primary when the database is first recovered and there may be a backlog of queries that can be handled by the primary replica while the delta replica recovers the secondary replicas. The database can begin processing queries once the quorum requirements are satisfied, but there may still be additional replicas to be instantiated based on the service parameters information 122.

FIG. 6B is a flow chart of an example process 640 for provisioning and operating databases that may be implemented by the cloud-based database service 110 described in the preceding examples.

The process 640 includes an operation 642 of operating a database that includes a plurality of replicas. The plurality of replicas includes a primary replica, a first secondary replica, and a delta replica. The primary replica is capable of processing both read and write operations. The first secondary replica includes a copy of data and transactional log information of the primary replica. The first secondary replica is capable of processing read operations but not write operations. The delta replica includes a copy of the transactional log information of the primary replica but not the data from the primary replica. The delta replica being unable to handle read operations or write operations.

The process 640 includes an operation 644 of determining that a quorum loss has occurred in which the delta replica is operational, and the primary replica and the secondary replica are non-operational. As discussed in the preceding examples, the typically the primary replica of the database would instantiate one or more secondary replicas and/or delta replicas in response to such as failure. In instances in which the primary replica has failed, a secondary replica can instead be promoted to primary, and the new primary replica then instantiates one or more secondary replicas and/or delta replicas based on the service parameters information 122.

The process 640 includes an operation 646 of instantiating a recovery workflow using the delta replica. The recovery workflow includes the operations 648, 650, 652, and 654. As discussed above, the recovery workflow can be used to recover from a database failure in which the primary replica and secondary replicas are inoperable but there is at least one delta replica that is operational. The delta replica executes the recovery workflow to create a new secondary replica that can be promoted to the primary replica.

The process 640 includes an operation 648 of initializing a second secondary replica and an operation 650 of causing the second secondary replica to download backup data that represents a state of the primary replica prior to failure of the primary replica. The delta replica causes the secondary replica to download the full backup data 402 from the database backup data 116.

The process 640 includes an operation 652 of updating the secondary replica using the backup data. The secondary replica uses the full backup data 402 to update the secondary replica to the state of the primary replica at the time that the full backup of the primary replica was captured. The delta replica can also perform additional updates on the secondary replica using the log backup data 404 and log buffers from the delta replica. The delta replica determines the order that the transactions included in the log backup data 404 and log buffers should be applied so that the order of the write operations in these two data sources are performed in the same order that were originally performed on the primary replica. A technical benefit of this approach is that the delta replica is able to use the log backup data 404 and log buffers to update the secondary replica to the state of the primary replica before the failure occurred. The full backup data 402 is only updated periodically.

The process 640 includes an operation 654 of promoting the secondary replica to become a new primary replica. Once the secondary replica has been updated to the state of the primary replica prior to the failure of the primary replica, the secondary replica is then promoted to the primary replica. The new primary replica can then instantiate one or more secondary replicas and/or one or more delta replicas according to the service parameters information 122. In some implementations, the primary replica may instead rely on the delta replica to utilize the recovery workflow to instantiate the one or more secondary replicas rather than relying on the primary replica to instantiate the secondary replicas. This approach can be utilized to reduce the load on the primary replica. This can be especially useful for reducing the load on the primary when the database is first recovered and there may be a backlog of queries that can be handled by the primary replica while the delta replica recovers the secondary replicas. The database can begin processing queries once the quorum requirements are satisfied, but there may still be additional replicas to be instantiated based on the service parameters information 122.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
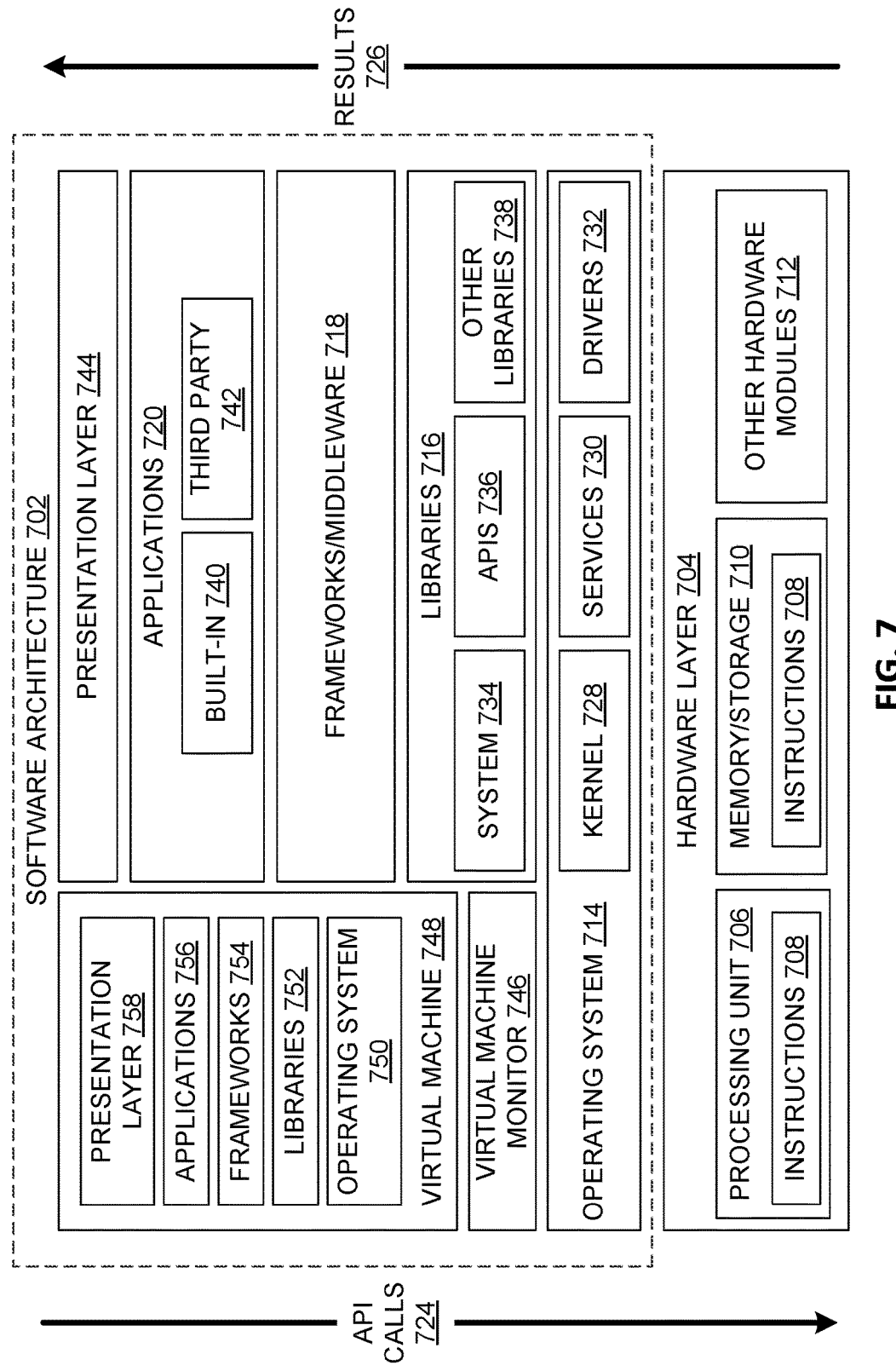
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
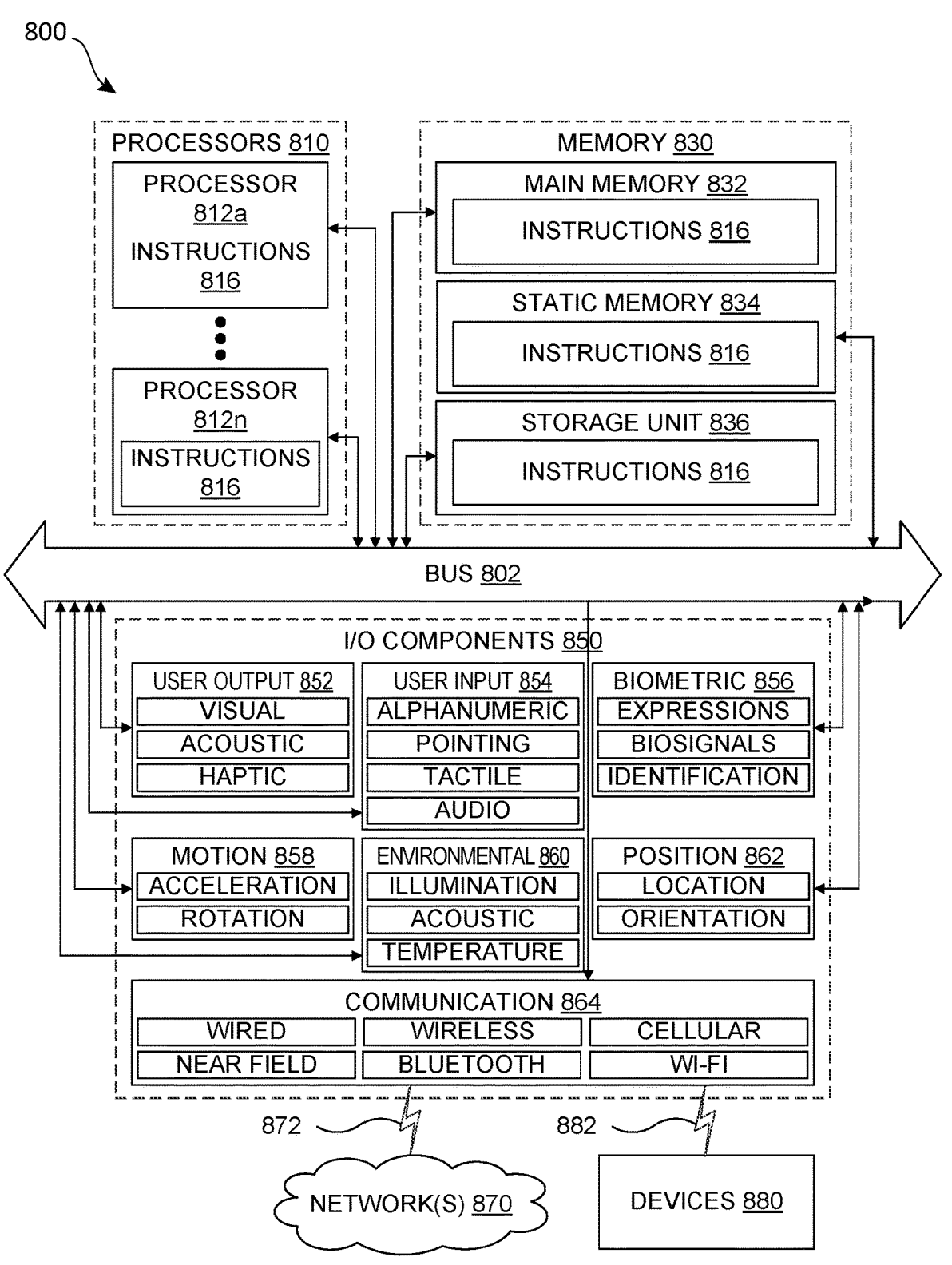
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" Includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors $812a$ to $812n$ that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor alone or in combination with other processors to perform operations of:
   operating a database including a plurality of replicas associated with a tenant of the data processing system, the database comprises software for collecting, organizing, storing, accessing, and manipulating electronic data, the database including data structures for organizing and storing the electronic data, wherein a replica of the database represents a copy of the database, and wherein operating the database includes:
   operating a primary replica capable of processing both read and write operations;
   operating a secondary replica capable of processing read operations, the secondary replica is a read-only replica in which data of the secondary replica is synchronized with data in the primary replica;
   operating a delta replica providing quorum support without providing read or write operations, the delta replica comprising a copy of transactional log information of the primary replica that indicates changes that have been made to the data of the primary replica without including the data of the primary replica; and
   maintaining backup data synchronized with the data of the primary replica in a memory of the data processing system allocated to the tenant on a separate server from computing resources allocated to the plurality of replicas;
   automatically determining that the primary replica and the secondary replica have experienced a failure and are non-operational and that the delta replica is operational; and
   automatically instantiating a recovery workflow using a database backup unit of the delta replica, the recovery workflow comprising:
   initializing a second secondary replica to be synchronized with a state of the data of the primary replica prior to the failure of the primary replica;
   causing the second secondary replica to download the backup data from the memory in the data processing system allocated to the tenant;
   updating the second secondary replica using the backup data to synchronize the second secondary replica with the state of the primary replica prior to the failure of the primary replica; and
   promoting the second secondary replica to become a new primary replica.

2. The data processing system of claim 1, wherein each replica is instantiated on a different database server, and wherein the transactional log information is a data file associated with each replica of the database that keeps track of operations that are performed on the database.

3. The data processing system of claim 1, wherein the machine-readable medium further includes instructions configured to cause the processor alone or in combination with other processors, responsive to promoting the secondary replica to the new primary replica, to perform operations of:
   causing the new primary replica to access service parameters for the database that specify a minimum number of secondary replicas to operate for the database, a minimum number of delta replicas to operate for the database, or both; and causing the new primary replica to instantiate additional replicas according to the service parameters.

4. The data processing system of claim 1, wherein causing the second secondary replica to download backup data further comprises:

causing the secondary replica to download a full backup of the primary replica that represents a state of the primary replica at a time that the full backup was captured, wherein updating the secondary replica using the backup data further comprises updating the secondary replica using full backup of the primary replica.

5. The data processing system of claim 4, wherein the machine-readable medium further includes instructions configured to cause the processor alone or in combination with other processors to perform operations of:

determining that the full backup of the primary replica does not represent a state of the primary replica at the time that the primary replica experienced the failure.

6. The data processing system of claim 4, wherein the machine-readable medium further includes instructions configured to cause the processor alone or in combination with other processors to perform operations of:

causing the delta replica to download log backup data that includes first transactional logs information associated with the primary replica, the first transactional logs information representing first write operations made to the data of the primary replica after the full backup was captured; and accessing a log buffer of the delta replica to access second transactional log information, the second transactional log information representing second write operations made to the data of the primary replica after the full backup was captured.

7. The data processing system of claim 6, wherein the machine-readable medium further includes instructions configured to cause the processor alone or in combination with other processors to perform operations of:

determining an order in which to apply the first write operations and the second write operations based on an order in which the first write operations and the second write operations were performed on the primary replica; and updating the secondary replica with the first write operations and the second write operations.

8. The data processing system of claim 1, wherein the machine-readable medium further includes instructions configured to cause the processor alone or in combination with other processors to perform operations of:

causing the new primary replica to access service parameters for the database that specify a minimum number of secondary replicas to operate for the database, a minimum number of delta replicas to operate for the database, or both;

determining that the minimum number of secondary replicas or minimum number of delta replicas are not currently instantiated; and causing the delta replica to instantiate one or more secondary replicas, one or more delta replicas, or both to satisfy the service parameters.

9. A method implemented in a data processing system for provisioning and operating databases, the method comprising:

operating a database including a plurality of replicas associated with a tenant of the data processing system, the database comprises software for collecting, organizing, storing, accessing, and manipulating electronic data, the database including data structures for organizing and storing the electronic data, wherein a replica of the database represents a copy of the database, and wherein operating the database includes:

operating a primary replica capable of processing both read and write operations;

operating a secondary replica capable of processing read operations, the secondary replica is a read-only replica in which data of the secondary replica is synchronized with data in the primary replica;

operating a delta replica providing quorum support without providing read or write operations, the delta replica comprising a copy of transactional log information of the primary replica that indicates changes that have been made to the data of the primary replica without including the data of the primary replica; and maintaining backup data synchronized with the data of the primary replica in a memory of the data processing system allocated to the tenant on a separate server from computing resources allocated to the plurality of replicas;

automatically determining that the primary replica and the secondary replica have experienced a failure and are non-operational and that the delta replica is operational; and automatically instantiating a recovery workflow using the delta replica, the recovery workflow comprising:

initializing a second secondary replica to be synchronized with a state of the data of the primary replica prior to the failure of the primary replica;

causing the second secondary replica to download the backup data from the memory in the data processing system allocated to the tenant;

updating the second secondary replica using the backup data to synchronize the second secondary replica with the state of the primary replica prior to the failure of the primary replica; and promoting the second secondary replica to become a new primary replica.

10. The method of claim 9, wherein in response to promoting the secondary replica to the primary replica, responsive to promoting the secondary replica to the primary replica, to perform operations of:

causing the new primary replica to access service parameters for the database that specify a minimum number of secondary replicas to operate for the database, a minimum number of delta replicas to operate for the database, or both; and causing the new primary replica to instantiate additional replicas according to the service parameters.

11. The method of claim 9, wherein causing the second secondary replica to download backup data further comprises:

causing the secondary replica to download a full backup of the primary replica that represents a state of the primary replica at a time that the full backup was captured, wherein updating the secondary replica using the backup data further comprises updating the secondary replica using full backup of the primary replica.

12. The method of claim 11, further comprising:

determining that the full backup of the primary replica does not represent a state of the primary replica at the time that the primary replica experienced the failure.

13. The method of claim 12, further comprising:

causing the delta replica to download log backup data that includes first transactional logs information associated with the primary replica, the first transactional logs information representing first write operations made to the data of the primary replica after the full backup was captured; and accessing a log buffer of the delta replica to access second transactional log information, the second transactional log information representing second write operations made to the data of the primary replica after the full backup was captured.

14. The method of claim 13, further comprising:

determining an order in which to apply first write operations and the second write operations based on an order in which the first write operations and the second write operations were performed on the primary replica; and updating the secondary replica with the first write operations and the second write operations.

15. The method of claim 9, further comprising:

causing the new primary replica to access service parameters for the database that specify a minimum number of secondary replicas to operate for the database, a minimum number of delta replicas to operate for the database, or both;

determining that the minimum number of secondary replicas or minimum number of delta replicas are not currently instantiated; and causing the delta replica to instantiate one or more secondary replicas, one or more delta replicas, or both to satisfy the service parameters.

16. A data processing system comprising:

a processor; and a machine-readable medium storing executable instructions that, when executed, cause the processor alone or in combination with other processors to perform operations of:

operating a database including a plurality of replicas associated with a tenant of the data processing system, the database comprises software for collecting, organizing, storing, accessing, and manipulating electronic data, the database including data structures for organizing and storing the electronic data, wherein a replica of the database represents a copy of the database, and wherein operating the database includes:

operating a primary replica capable of processing both read and write operations;

operating a secondary replica capable of processing read operations, the secondary replica is a read-only replica in which data of the secondary replica is synchronized with data in the primary replica;

operating a delta replica providing quorum support without providing read or write operations, the delta replica comprising a copy of transactional log information of the primary replica that indicates changes that have been made to the data of the primary replica without including the data of the primary replica; and maintaining backup data synchronized with the data of the primary replica in a memory of the data processing system allocated to the tenant on a separate server from computing resources allocated to the plurality of replicas;

automatically determining that a quorum loss has occurred in which the delta replica is operational and the primary replica and the secondary replica are non-operational; and automatically instantiating a recovery workflow using the delta replica, the recovery workflow comprising:

initializing a second secondary replica to be synchronized with a state of the data of the primary replica prior to a failure of the primary replica;

causing the second secondary replica to download the backup data from the memory in the data processing system allocated to the tenant;

updating the second secondary replica using the backup data to synchronize the second secondary replica with the state of the primary replica prior to the failure of the primary replica; and promoting the second secondary replica to become a new primary replica.

17. The data processing system of claim 16, wherein the machine-readable medium further includes instructions configured to cause the processor alone or in combination with other processors, responsive to promoting the secondary replica to the new primary replica, to perform operations of:

causing the new primary replica to access service parameters for the database that specify a minimum number of secondary replicas to operate for the database, a minimum number of delta replicas to operate for the database, or both; and causing the new primary replica to instantiate additional replicas according to the service parameters.

18. The data processing system of claim 16, wherein causing the second secondary replica to download backup data further comprises:

causing the secondary replica to download a full backup of the primary replica that represents a state of the primary replica at a time that the full backup was captured, wherein updating the secondary replica using the backup data further comprises updating the secondary replica using full backup of the primary replica.

19. The data processing system of claim 18, wherein the machine-readable medium further includes instructions configured to cause the processor alone or in combination with other processors to perform operations of:

determining that the full backup of the primary replica does not represent a state of the primary replica at the time that the primary replica experienced the failure.

20. The data processing system of claim 19, wherein the machine-readable medium further includes instructions configured to cause the processor alone or in combination with other processors to perform operations of:

causing the delta replica to download log backup data that includes first transactional logs information associated with the primary replica, the first transactional logs information representing first write operations made to the data of the primary replica after the full backup was captured; and accessing a log buffer of the delta replica to access second transactional log information, the second transactional log information representing second write operations made to the data of the primary replica after the full backup was captured.

\* \* \* \* \*